March 19, 1935.  D. B. REPLOGLE  1,994,871
FURNITURE DUSTING TOOL
Filed July 14, 1931  2 Sheets-Sheet 1
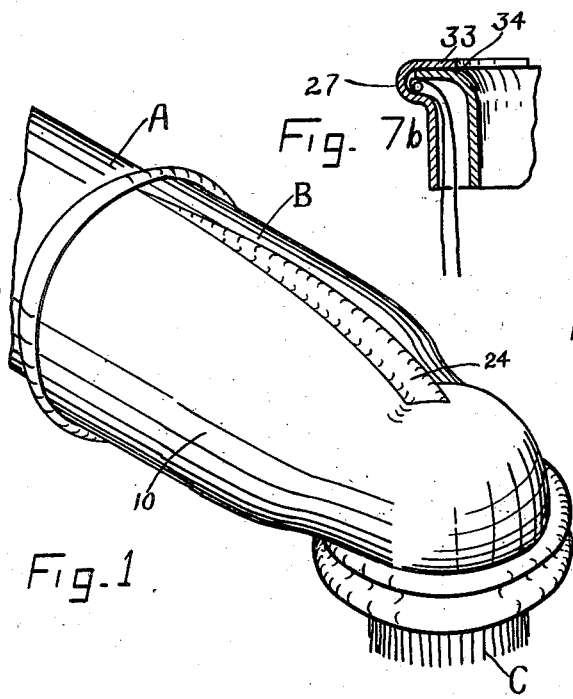
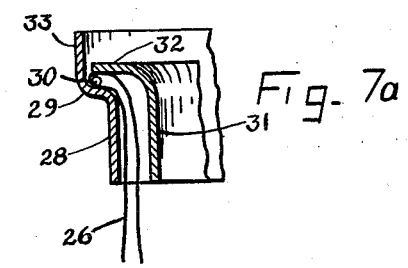
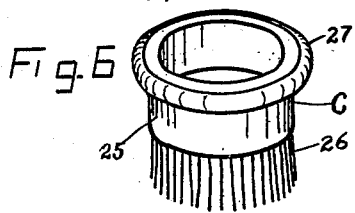
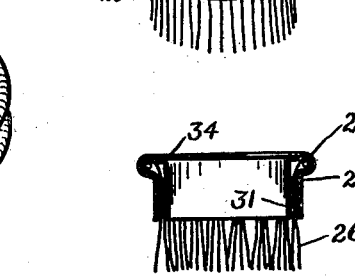
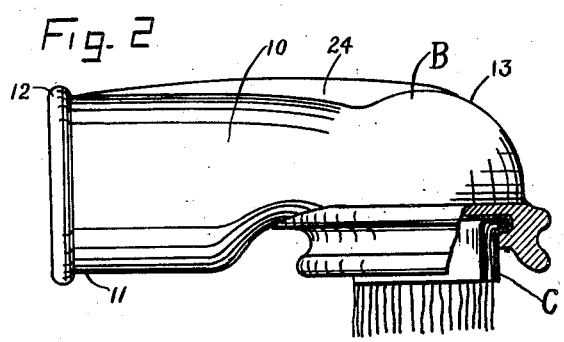
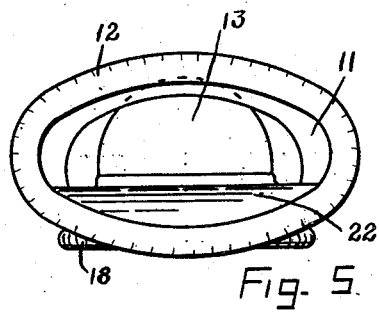
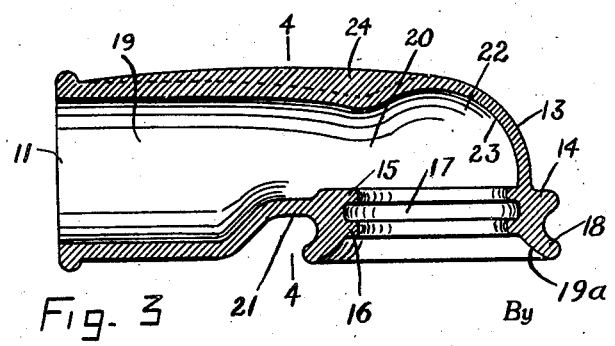
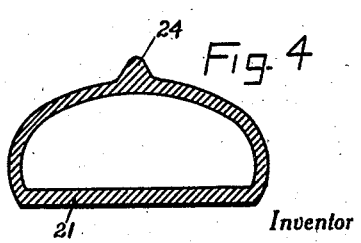
Inventor
D.B. Replogle
By  Munson H. Lane
Attorney March 19, 1935.　　D. B. REPLOGLE　　1,994,871
FURNITURE DUSTING TOOL
Filed July 14, 1931　　2 Sheets-Sheet 2
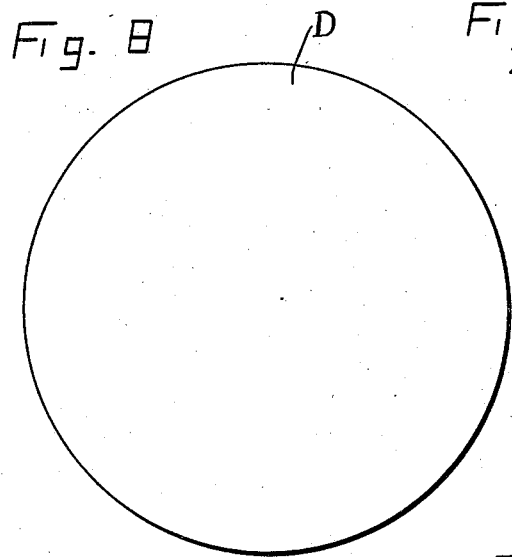
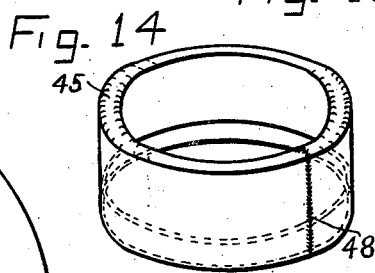
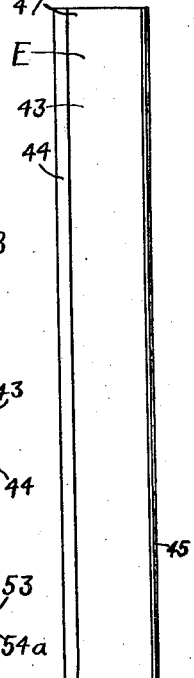
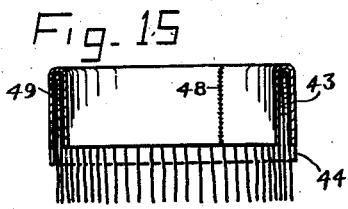
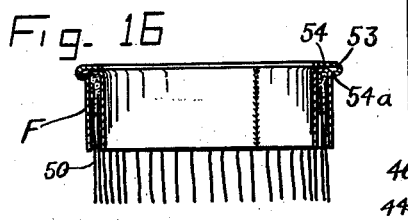
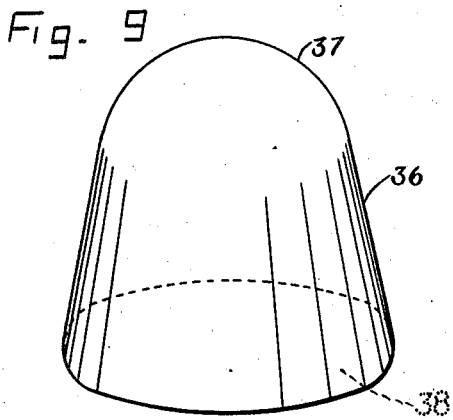
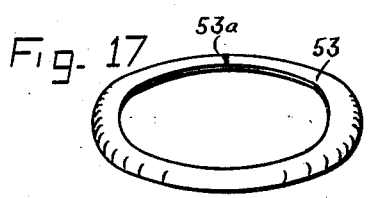
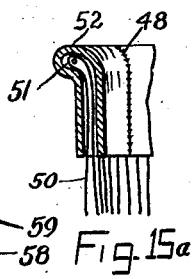
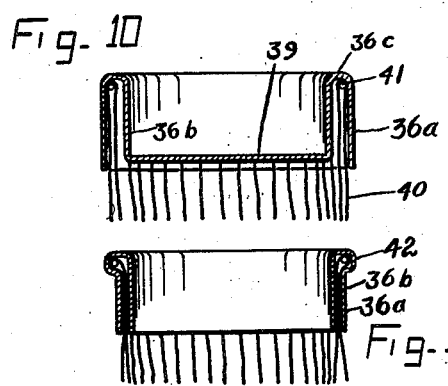
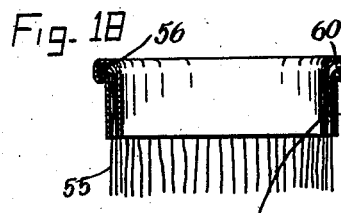
Inventor
D. B. Replogle
Attorney Patented Mar. 19, 1935

1,994,871

UNITED STATES PATENT OFFICE 1,994,871

FURNITURE DUSTING TOOL

Daniel Benson Replogle, Berkeley, Calif., assignor to Citizens Trust Company, trustee, Toledo, Ohio, a corporation of Ohio Application July 14, 1931, Serial No. 550,786

13 Claims. (Cl. 15—158)

The invention relates to cleaning and dusting tools, and more particularly to pneumatic or suction cleaning tools adapted to be attached to the ends of suction pipes or handles used in connection with either stationary or portable pneumatic cleaning apparatus.

Certain features of the present invention are disclosed in my prior application Serial No. 470,511, filed July 24, 1930, of which the present application is a continuation in part. The present invention is in the nature of an improvement over a device disclosed in my prior Patent No. 1,403,524, dated January 7, 1922.

In its broadest aspects the present application constitutes a continuation in part of my application Serial No. 15,529, filed March 14, 1925, which discloses the combination in a suction cleaner of an application head or body member having a pocket formed therein provided with resilient walls, into which pocket a dust agitating bristle brush is forced, which is detachably held in position by the resilient walls. In my prior application the body member was preferably composed of thin resilient sheet metal, whereas according to the present embodiment of the invention the body member is preferably composed of elastic molded rubber.

In common with the cleaning tool covered by my Patent, No. 1,403,524, the present invention relates to a suction tool having a body of resilient elastic material, which comprises a hollow shank adapted to be connected at one end to a suitable suction pipe, and having at the other end an open-mouthed application head, the mouth of which is adapted to receive a suitable cleaning or brush element.

The body of the tool is preferably of molded material, generally rubber, which is sufficiently elastic to allow the ends of the body to be deformed or stretched so as to fit over the suction handle and the brush members, but is of sufficient strength to tightly grip these members and hold them firmly in position after the parts have once been assembled. The rubber tool may be employed directly without using the brush, and according to my invention the mouth portion preferably flares outwardly to provide a sort of Venturi opening, which insures smooth and swift passage of air into the head of the tool. The mouth portion being of rubber of course avoids marring or scarring furniture to which it may be applied.

According to the prior embodiment of my invention, the molded rubber body member was provided with a rib for engagement with a groove formed in the outer surface of the brush or application member. This arrangement possesses several disadvantages. In the first place, the formation of a groove in the body of the brush necessitates the use of thick materials, such as wood, gutta-percha or the like. Such thick materials, of course, render the brush cumbersome and furthermore obstruct the air passage through the tool. According to the present invention, the tool is formed of thin material, preferably sheet metal, in the form of a skirt, comprising inner and outer rings which grip the bristles between them. A flange is formed at the top of the skirt extending outwardly and adapted to cooperate with an interior circumferential groove molded in the mouth portion of the application head. Such flange is readily formed in the tool, and the groove can, of course, be easily molded in the body member, which is formed of rubber or like moldable material.

The advantages of employing a metal skirt or ring for the brush are many, among which may be mentioned the enlarged throat, economizing space, the strength of the skirt and the fact that the bristles are arranged regularly and continuously, as compared with the usual irregular arrangement of bristles in a plurality of tufts. Furthermore, the metal skirt may be so compressed as to secure the bristles against falling out.

According to the present invention, therefore, an interior circumferential groove is molded in the mouth portion of the application head, with one rib above and another below the groove, which groove is adapted to receive the external flange or bead of the special brush or application member. Thus the novel construction, both of the tool body and of the brush member, together with the connection between the same, constitute important features of the invention.

In order to insure a swift flow of air and dust from the application head into and through the shank member, the throat which connects the passages in the shank and application head is slightly reduced, providing a Venturi action. There is, however, a tendency for the shank to bend or collapse adjacent this reduced portion on the application of pressure upon the tool. To avoid this defect a reinforcing rib is preferably provided extending longitudinally along the upper portion of the shank, such rib being preferably thickest adjacent the restricted throat portion at the juncture of the application head and shank.

Other important features of the invention will be more readily understood by reference to the accompanying drawings and the following detailed description, which are intended, however, as illustrative of the invention, rather than as limiting the same to the specific details herein disclosed.

In the drawings:

Fig. 1 is a perspective view illustrating one form of the tool in use, the tool being herein shown applied to a round suction pipe and the brush element inserted in the mouth of the tool;

Fig. 2 is a side elevation of the tool with the brush element assembled ready for use, portions of the tool being broken away to show the snug fit between the brush and the tool body;

Fig. 3 is a longitudinal section passing through the reinforcing rib of the tool body, and showing the tool body ready for use, but with the brush removed;

Fig. 4 is a transverse section on line 4—4 of Fig. 3, showing the reinforcing rib;

Fig. 5 is a view looking into that end of the shank of the rubber tool body to which the suction pipe or cleaner handle is to be applied;

Fig. 6 is a perspective view of a preferred form of brush element which includes a hollow ring or skirt portion for holding the bristles and an external circumferential rib or bead for engagement with the groove in the application head;

Fig. 7 is a vertical sectional view through the skirt and bristle portions of the brush shown in Fig. 6;

Fig. 7a and Fig. 7b are fragmentary views illustrating the method of forming the brush disclosed in Figs. 6 and 7;

Figs. 8, 9 and 10 are views illustrating steps in the manufacture of a slightly different form of brush from a circular blank, and Fig. 11 represents the finished brush;

Fig. 12 is an elevational view of a blank from which another form of brush is made;

Fig. 13 is an end view of the blank;

Figs. 14, 15 and 15a are views illustrating steps in the manufacture of the brush from the blank shown in Fig. 12;

Fig. 16 is a sectional view of a further modification of the brush, in which the flange for securing the brush to the tool body is formed separately from and welded to the skirt portion;

Fig. 17 is a perspective view of the ring which is to be welded to the skirt portion to form the flange for the brush illustrated in Fig. 16, and Fig. 18 is a sectional view showing a still further modification of the brush.

Referring particularly to Fig. 1, A denotes a suction pipe or handle connected to a suitable source of suction, B the hollow body portion of an application tool which is detachably connected to the suction pipe A. At the mouth of the body member B, a suitable brush or application member C is detachably applied.

The body portion is preferably composed of molded elastic material, such as rubber. The body comprises a shank 10 to the end 11 of which the suction handle is applied. The end 11 is normally oval, as clearly indicated in Fig. 5, and is thus adapted to readily engage a tube or pipe which may be of either rounded or flattened formation as disclosed in my Patent 1,403,524, the oval shape being intermediate between the flat and the rounded forms, and rendering the shank much more adaptable than in the case of a shank whose end is normally flat or round. A bead 12 is formed adjacent the end 11 and serves as a reinforcement insuring proper gripping of the suction pipe A to produce an air-tight connection.

Connected to the opposite end of the shank 10 is a rounded application head 13 having a downwardly extending mouth portion 14 provided with a pair of internal spaced ribs 15, 16, between which is located a groove 17 to receive an external flange formed on the brush member. These ribs 15 and 16, constituting the walls of groove 17, being formed integral with the body of the tool which is composed of resilient material, are themselves resilient, and when forced apart to receive the external flange of the brush member tend to return to their original position and thus firmly but detachably grip the flange of the brush member owing to the resilience of the ribs or walls. Below the rib 16 the mouth portion of the application head flares outwardly, forming a Venturi inlet. This flaring portion is indicated at 19a. An external rib 18 surrounds the inlet. The shank is hollow, and a passage 19 extends therethrough. The passage is constricted at 20, forming a throat at the juncture between the shank and the application head. The under portion of the shank is reduced as at 21, forming a flattened surface, shown more clearly in Fig. 4. Beyond the throat portion 20, and within the application head, there is an enlarged opening or chamber having a curved interior surface 23, which permits smooth flow of air. This surface directs the dust-laden air into the throat portion. Below the chamber 22 is the mouth portion of the application head, which, as stated above, flares outwardly as at 19a. Thus swift, unrestricted movemnt of dust-laden air through the mouth and application head is insured, this movement being aided by the Venturi action caused by the restricted throat 20 opening into the enlarged passage 19.

To counteract any tendency for the shank to collapse adjacent its line of juncture with the application head, a reinforcing rib 24 is preferably provided, extending longitudinally along the upper portion of the shank, said rib being shown as thickest opposite the restricted neck 20 and cut-away portion 21.

Since the tool body B is preferably composed of moldable material, it will be obvious that the various ribs, grooves, cut-away portions, and restricted portions may be easily and inexpensively formed. Morover, the rubber prevents marring or injuring of the surface to which the tool may be applied. The tool body may be used, if desired, without the additional brush member, in which case the mouth of the application head is applied directly to the surface to be cleaned. Preferably, however, a brush C is employed in conjunction therewith.

It will be noted that the hollow body member B of the cleaning tool is composed of resilient material, and its primary function is to provide a detachable connection between a suction pipe or tube and an application member, although in some cases the mouth of the body member itself may be used as a dusting member, without the use of a separate application member, this feature of the invention being separately claimed in my application Serial No. 470,511. Where the body member is used in connection with an application member its mouth portion serves as a brush mounting and for this purpose is provided with the channel 17, which in the present embodiment of the invention is in communication with the hollow interior of the body member when the brush is removed, whereas in the embodiment disclosed in my prior application Serial No. 15,529, the channel is separated from the interior by one of the resilient walls of the channel. It will be further noted that the shank portion of the body member has been especially adapted or shaped to detachably fit over the open end of the suction tube A, which may be either round or flat, and preferably comprises one of the detachable extension members adapted to be secured to the hollow handle of a cleaning apparatus such as is shown in my prior patent granted April 14, 1925 on application Serial No. 279,467, filed February 26, 1919. In my cleaning tool a passageway extends throughout the entire length of the body member, being restricted somewhat adjacent the throat portion, while the lower portion of the shank portion to the rear of the reduced portion 21 provides a recess which opens into the main portion of the passageway and which is adapted to receive the suction pipe or tube A, while the channel, groove or pocket 17 adjacent the opposite end of the body member is adapted to detachably retain the brush member when its bead is forced into the channel. The longitudinal rib 24 extending along the upper side of the body member opposite the reduced portion 21 and the recessed portion of the shank serves to prevent collapsing of the tool when pressure is applied thereto.

A satisfactory form of brush is shown in Figs. 6 and 7. This brush comprises a hollow metal portion or skirt, designated generally by the reference numeral 25, which skirt retains the bristles 26 which extend beyond the lower portion thereof. At the upper portion of the skirt there is formed an outwardly extending circumferential hollow flange 27, which is adapted to engage within the groove 17 in the molded body member. The flange being hollow and resilient, and the body member being composed of flexible material, such as rubber, it is obvious that an airtight fit between the brush and body member will be insured.

Numerous methods of constructing the brush may be satisfactorily employed, and for the purpose of illustration, a few of these methods will be described in detail in order that the simplicity and economy of the brush will become apparent.

Referring first to Fig. 7, it will be noted that the skirt portion of the body comprises an outer ring 28 and an inner ring 31, which tightly grip between them the bristles 26. The brush may be formed as indicated in Fig. 7a, by first bending the upper portion of the ring 28 outwardly to provide an annular shoulder 29, upon which a wire ring 30, carrying the bristles 26 folded thereover, may be laid. The inner ring 31 is next applied, and a flange 32 thereof bent over the wire 30 and the upper portion of the bristles. In order to hold the flange 32 in place, the outer ring 28 is bent over the flange 32, as indicated at 33, most clearly shown in Fig. 7b. The bending of the upper portion of the member 28 forms the flange 27, which coacts with the groove 17 in the body member, and at the same time the bent-over portion 33 serves to firmly hold the parts in place, tightly gripping the wire which supports the bristle members. If desired, the inner and outer rings may be welded together at their meeting portion along the line 34, but such welding is not essential, as the parts will remain in assembled condition owing to the cooperation between the bent-over flanges 32 and 33, the wire 30 and bristles 26.

Another method of forming a brush for use with the body member is illustrated in Figs. 8 to 11 inclusive. Fig. 8 illustrates a circular blank D, preferably formed of metal, although fiber might also be employed. The blank is then converted into the inverted cup-shaped member shown in Fig. 9 by stamping. This member includes a flaring skirt 36, a rounded top 37 and an open bottom 38. The next operation consists in pressing inwardly the top portion 37 by successive stamping operations until the article assumes the shape shown in Fig. 10. It will be noted that the lower portion of the flaring skirt has been pressed inwardly so as to assume a vertical position. As shown in Fig. 10, the article now comprises an outer ring 36a and an inner ring 36b, connected by a rounded portion 36c, these three parts having been formed from the skirt 36 of the cup-shaped member shown in Fig. 9. The rounded top 37 has been converted into a substantially flat bottom member 39. It will be noted further that the outer ring member 36a is somewhat longer than the inner ring member 36b. Bristles 40, looped over a wire ring 41, may now be placed in position within the upper portion of the annular space between the inner and outer rings. Paste or adhesive may be employed to temporarily hold the ring and accompanying bristles in position. To complete the brush an external bead 42 is formed at the top of the metal skirt member, and in forming this bead it will be noted that the outer ring member 36a will be shortened so as to be of equal length with the inner member 36b. The circular bottom 39 may be cut out in the same stamping operation in which the bead 42 is formed, leaving an unobstructed interior to permit the free passage of air through the center of the brush. The flange 42 provides means for attachment of the brush to the body member B, and at the same time forms an internal shoulder which holds the bristles 40 and wire ring 41.

Another method of forming a brush suitable for use with the body member B is illustrated in Figs. 12, 13, 14, 15 and 15a. Reference character E in Fig. 12 denotes generally a metal strip or blank which has been folded over to substantially U-shape. The two legs 43 and 44 of the U are of unequal lengths and are connected by a curved portion 45. The U-shaped member shown in Figs. 12 and 13 may then be curved about a suitable mandrel and the ends 46 and 47 of the strip welded together, as indicated at 48 in Fig. 14. This forms a double-walled skirt or ring member in which the legs 43 and 44 of the U-shaped blank now form inner and outer rings, with an annular connecting portion 45 at the top thereof. The outer ring extends downwardly beyond the inner ring. Bristles 50, mounted upon a wire ring 51, may now be applied to the metal skirt in the same manner as described in reference to previous modifications of the invention. If necessary, a small quantity of paste 49 may be placed within the annular space between the inner and outer rings 43 and 44 to temporarily hold the bristles in position. A circumferential flange 52 is now formed by a suitable stamping operation, which simultaneously shortens the outer ring 44 so as to be of equal length with the inner ring 43.

In Fig. 16 another form of brush is shown which comprises a double skirt portion generally designated by reference character F. This skirt portion may be identical with the partially formed article shown in Fig. 15, except that the inner and outer ring portions of which the skirt is composed are of the same length. The bristles 50 are held in place within the skirt by means of paste 49. In the embodiment of the invention shown in Fig. 16, the bristles are mounted directly within the paste, without the use of a wire ring, although such ring may be employed if desired, and will aid in preventing the bristles from falling out. A flange for the skirt may be formed from a separate ring 53, shown in Fig. 17, which is also U-shaped in cross section and may be formed by folding over a flat strip of metal to provide a double strip somewhat similar to the blank E shown in Fig. 12, and then bringing the ends of the double strip together and welding the same as at 53a. Or, if desired, a ring may be stamped out from a flat material and its edges turned over to U-shaped form. The double ring 53 may now be applied at the top of the skirt F and spot-welded thereto as at 54 and 54a. The ring 53 now forms the external circumferential flange by means of which the brush may be attached to the body member B.

A still further modification of the invention is disclosed in Fig. 18, which arrangement is quite similar to that disclosed in Fig. 7. The bristles 55, strung upon a wire ring 56, are held in position between an inner ring 57 and an outer ring 58, which comprise the double metal skirt portion of the body. The outer ring is provided with an outwardly turned flange 59, and the inner ring with the flange 60, which is bent over the flange 59 of the outer ring after the bristles have been positioned between the two rings. The turned-over flange 60 forms an external circumferential flange for the brush by means of which the same may be held within the body member B. A tight fit is formed between the flanges 59 and 60 and the bristles and wire ring are compressed so as to be tightly held in position.

The various modifications of the invention described above are sufficient to show the practicability of forming a brush of a metallic annular channel member in which the bristles are mounted and generally held by compression between the inner and outer rings of the channel member. These various modifications also illustrate practical means for forming an external circumferential bead at the top of the skirt or channel, whereby the brush may be conveniently held in position and detachably connected to the annular grooved mouth portion of the body of a cleaner tool. The external flange on the brush, while constituting an important feature of the present invention as illustrating a practical means for detachably connecting the brush to the body of the suction cleaner tool, may be omitted where other means are provided for making such connection, and the advantages of the metal skirt for holding the bristles firmly in position will be apparent regardless of whether the annular flange is employed or not.

The invention has been described in detail for the purpose of illustration, but it will be obvious that various changes or modifications not herein illustrated may be employed without departing from the spirit of the invention.

What I claim is:

1. In a suction cleaner of the character described, an open-mouthed rubber nozzle having an annular groove opening into the interior thereof, said groove having walls formed by a pair of resilient continuous ribs integral with the interior of the nozzle and constraining toward each other when forced apart, and a brush detachably mounted in said nozzle, said brush comprising a metallic skirt member having a peripheral bead adapted to be forced into said groove and detachably held by the resilience of said ribs, and bristles carried by said skirt having their tips extending beyond the same in a direction opposite to said bead.

2. A suction cleaning apparatus comprising a hollow elastic rubber body with contractile open ends, one end for securing it to the open end of a suction tube and the other end having a pair of internal ribs separated by a peripheral groove, adapted to engage with the hollow outward radially extending flange of an open centered application tool, and an application tool comprising a skirt including a pair of spaced rings, a hollow flange formed externally only on said skirt, and serving both for connecting said rings and for detachable engagement with said groove, and bristles arranged between said rings and secured within the hollow flange.

3. In a pneumatic cleaner, a brush comprising a hollow cylindrical metallic backing including a channel member composed of spaced rings and having a hollow bead connecting the rings and extending externally only thereof, whereby the interior is not obstructed, bristles secured within said hollow bead and extending between said rings with their tips projecting therefrom, and a brush mounting comprising a hollow elastic non-metallic body having an interior peripheral groove with integral resilient walls which when forced apart are adapted to grip between them the external flange of said brush.

4. In a pneumatic cleaner, a brush comprising a hollow cylindrical metallic backing including a channel member composed of spaced rings and having a hollow bead connecting the rings and extending externally only thereof, whereby the interior is not obstructed, bristles secured within said hollow bead and extending between said rings with their tips projecting therefrom, and a brush mounting comprising a hollow elastic non-metallic body having an interior peripheral groove with integral resilient walls which when forced apart are adapted to grip between them the external flange of said brush, said body having a protecting skirt portion extending substantially to the open edge of the metallic backing.

5. In combination with a suction nozzle composed of resilient material having a passageway therethrough and having an internal groove opening into the passageway and adapted to receive a detachable hollow brush; a brush comprising a cylindrical metallic channel skirt including a pair of spaced rings concentric with the passageway, a hollow peripheral bead adapted to be detachably retained in the internal groove of said nozzle, and extending externally only, whereby the interior passageway is unobstructed, and bristles arranged between said rings with their tips projecting beyond the skirt in one direction, and a portion thereof retained within said external bead.

6. A hollow brush suitable for attachment to an internally grooved suction nozzle, comprising a cylindrical metallic skirt including a pair of spaced rings parallel with the axis of the brush, bristles arranged between the rings with their tips extending beyond the same in one direction and a hollow bead formed externally only of said skirt and adapted to be detachably retained in the internal groove of said nozzle, the interior of the brush being unobstructed by any bead or projection, whereby free flow of air is permitted without formation of eddy currents.

7. A hollow brush suitable for attachment to an internally grooved suction nozzle, comprising a cylindrical metallic channel member having a double skirt portion and a hollow bead extending peripherally beyond the skirt externally only thereof, a wire ring of greater diameter than the skirt and having bristles looped thereover, said wire ring being retained within said external bead, and the bristles extending through said skirt portion with their tips projecting beyond the same.

8. A hollow application brush for suction cleaners having peripheral bristles looped to a peripheral wire, and the said wire with its looped bristles secured between concentric metallic rings parallel to the axis of the brush opening, the upper edges of said rings interlocking to form a hollow peripheral bead extending externally only, and the interior of the brush being unobstructed.

9. In a suction cleaner tool, a hollow application brush adapted to be detachably connected to the internally grooved mouth portion of the body of the tool, said brush comprising inner and outer metallic rings parallel to the axis of the brush opening and suitably secured together, and bristles held between said rings, said brush when assembled having a hollow peripheral bead extending externally only for engagement within said groove, the interior of the brush being unobstructed.

10. In a suction cleaner tool, a hollow application brush adapted to be detachably connected to the annularly grooved mouth portion of the body of the tool, said brush comprising a metallic cylindrical channel, the closed end of which is flared to a hollow bead extending externally only of the channel, said channel being filled with bristles the middle portions of which are looped about a wire ring, said ring fitting within the hollow bead and being of larger diameter than the channel.

11. An application brush for suction cleaners having a central opening, comprising a skirt including a pair of spaced rings parallel with the axis of the brush, a hollow bead formed externally only on said skirt and connecting said rings, and bristles arranged between the rings and secured within the bead, the interior opening of said brush being unobstructed.

12. A hollow brush for a suction cleaner, comprising a pair of spaced rings connected by a hollow bead extending externally only around the top of the brush, and a peripheral wire having bristles looped thereover secured within said bead, said bristles extending through the annular space between the rings and projecting beyond the rings, the interior of the brush being unobstructed.

13. A hollow brush for a suction cleaner, comprising an annular channel member, bristles secured within the channel, and a double ring member welded to the closed portion of the channel member and extending laterally beyond the same to form an external bead for attachment of the brush to an internally grooved suction nozzle.

DANIEL BENSON REPLOGLE.